United States Patent [19]

Burnham

[11] E Re. 30,104

[45] Reissued Oct. 2, 1979

[54] DOCK LEVELING APPARATUS

[75] Inventor: Peter B. Burnham, Upper Arlington, Ohio

[73] Assignee: Harsco Corporation, Camp Hill, Pa.

[21] Appl. No.: 776,514

[22] Filed: Mar. 11, 1977

Related U.S. Patent Documents

Reissue of:

[64] Patent No.: 3,982,295
Issued: Sep. 28, 1976
Appl. No.: 579,686
Filed: May 21, 1975

[51] Int. Cl.[2] ..... E01D 1/00
[52] U.S. Cl. ..... 14/71.3
[58] Field of Search ..... 14/71.3

[56] References Cited

U.S. PATENT DOCUMENTS

| | | | |
|---|---|---|---|
| 1,103,594 | 7/1914 | Lindsay | 292/262 |
| 2,905,965 | 9/1959 | Flint | 292/262 X |
| 3,323,158 | 6/1967 | Loomis | 14/71 |
| 3,411,168 | 11/1968 | Hecker | 14/71 |
| 3,475,778 | 11/1969 | Merrick | 14/71 |
| 3,699,601 | 10/1972 | Hecker | 14/71 |

OTHER PUBLICATIONS

"Layne," Publication.

*Primary Examiner*—Nile C. Byers
*Attorney, Agent, or Firm*—Cameron, Kerkam, Sutton, Stowell & Stowell

[57] ABSTRACT

A loading dock leveling apparatus including a ramp pivotable about its rear end and having a pivotable lip on its forward end. Apparatus is provided for projecting the lip outwardly after the ramp is raised beginning when the ramp is walked down to provide that the lip will engage the bed of a vehicle to be loaded or unloaded. The projecting apparatus includes a knuckle joint which pivots to projecting position on the ramp upswing and which is subsequently pivoted by a lever to release the projecting apparatus during the walk down but before the ramp descends to the highest serviceable vehicle level. A lip lock is provided for holding the lip in its projected position until the lip rests on the bed of the vehicle to be unloaded or until the ramp passes well below dock level and the lip lock is disengaged by a lip lock release.

22 Claims, 10 Drawing Figures

DOCK LEVELING APPARATUS

Matter enclosed in heavy brackets [ ] appears in the original patent but forms no part of this reissue specification; matter printed in italics indicates the additions made by reissue.

BACKGROUND OF THE INVENTION

Loading ramps to provide a bridge between a loading dock and the bed of a vehicle to be loaded or unloaded [is] *are* a well developed art. In its basic form the prior art apparatus includes a platform or ramp which is automatically raised by release of a spring, the actuation of a hydraulic motor, the release or falling of a weight or perhaps a motor designed to raise the ramp by gear connections.

Ordinarily, the pivotable ramp is mounted on a frame built into a pit in the loading dock. Traditionally, the upper surface of the ramp will be coplanar with the surface of the loading [deck] *dock*. The rear edge of the ramp is pivoted about an axis at or near the level of the loading dock and the forward end of the [deck] *ramp* includes a lip which is pivotable and projectable to lie on the bed of the vehicle to be serviced.

By whatever means, the ramp will be raised and then the workman will walk out on the raised ramp. Some automatic or semi-automatic mechanical structure comes into play to project the lip progressively as the ramp itself is "walked down" on some newer models, but for the most part, the lip will be projected by some mechanical apparatus on the upswing. At some stage during the walk down process the lip projecting means is slowly released by the projecting means and a lip lock holds the lip in projected position. The lock is usually released by gravity or springs when the lip engages the truck bed.

SUMMARY OF THE INVENTION

Conventional apparatus is used herein to a certain extent and it includes a ramp mounted on a frame designed to fit into a loading dock pit designed to house a dock leveling apparatus. The ramp is pivotally attached to the rearmost portion of the frame and designed to be coplanar at that point with the loading dock. Any conventional apparatus may be used to raise the ramp. It is clear that the apparatus of this invention could be operated without a pit. For example, the leveler could be mounted in front of or on top of the dock.

Mechanical means for projecting the lip during the walk down of the ramp include telescoping tubes which together form a straight arm pivoted from both ends with one end being pivoted from a lug mounted on the lip and the other end being pivoted from a short bar. The short bar is in turn pivoted on its other end from the frame. Intermediate the ends of the short bar is a projection which limits the forward and downward pivoting of the bar and arm. A bolt in the outer portion of the projection allows adjustment of the degree of pivoting for reasons which will be explained subsequently.

A lip lock is designed to be mounted with one end pivoted from a lug mounted on the under surface of the lip. The other end of the lip lock structure is slidingly supported by a pin projecting from lug means on the underside of the ramp. During the walk down period, at the time the lip projecting means has projected the lip to approximately the needed extension, the pin slides into a locking slot *or notch* in the lip lock apparatus which prevents the downward rotation of the lip. At a point in time shortly after the latching by the lip lock apparatus, the lip projecting means is released and the sole lip support is the lip lock means which will retain the lip in its outwardly projected position as the ramp continues to descend until one of two things happens. Either the lip will engage the bed of a truck which will in itself rotate the lip to a position approximately parallel with the plane of the ramp or the ramp will continue to descend below the dock level of the loading dock until the lip lock means reaches an upwardly extending projection mounted on the lower portion of the mounting frame which will release the lip lock means and allow the lip to swing downward by gravity.

The many bars, levers, arms, etc. involved in the lip projecting and locking units are all related lengths. The adjusting means associated with the short bar of the lip projecting means allows much looser manufacturing tolerances as to the lengths, bolt holes, grooves, etc. because the manufacturing differences can be [accomodated] *accommodated.*

Having thus given a summary of the invention, a brief description of the drawings and a detailed description of the preferred embodiment follow and objects of this invention will become clear from a reading of the description of the preferred embodiment.

BRIEF DESCRIPTION OF THE DRAWINGS

FIGS. 2-5 show sequential operations, all on the same 2—2 section line.

FIG. 3 is a fragmentary sectional view similar to FIG. 2 but with the ramp raised to its highest position for walk down.

FIG. 4 is a fragmentary sectional view similar to FIG. 3 but after walk down has started, at the time the lip lock has engaged and just prior to the time the lip projecting means releases.

FIG. 5 is a fragmentary sectional view showing the apparatus in operative position with the lip in engagement with the bed of the truck to be serviced.

FIG. 6-9 are all taken along the same section line 6—6 to show the same sequence illustrated in FIGS. 2-5.

DESCRIPTION OF THE PREFERRED EMBODIMENT

Figure 1:
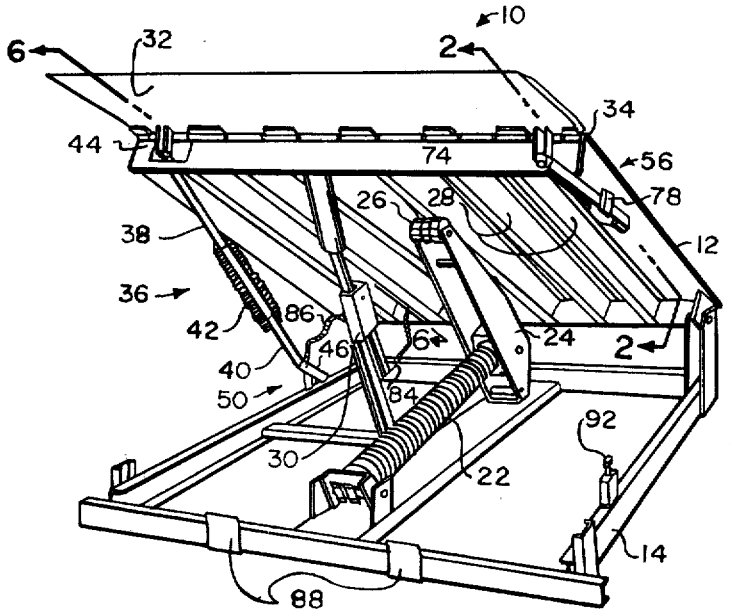
FIG. 1 is a perspective view of the dock leveling apparatus of this invention.

Dock leveling apparatus indicated generally at 10 is designed to be mounted in a pit 11 formed at one edge of the loading dock, however, in some instances the apparatus may be mounted as a dock extension projecting beyond the edge of a loading dock or on top of an existing dock. But it is the intention of this invention that the deck or ramp 12 mounted on frame 14 be pivoted about an axis 16 near or just below the upper planer surface 18 of the loading dock 20 except for those cases where the leveler is mounted on top of the dock.

In this instance, a spring 22 is shown biasing the ramp 12 upwardly in combination with a lever arm 24 and rollers 26 which may roll on the underside of the ramp or between the beams 28. While spring biasing means 22 is illustrated, it is clear that hydraulic means might be used with a hydraulic motor, piston etc. as would be clear to those having ordinary skill in the art.

Figure 2:
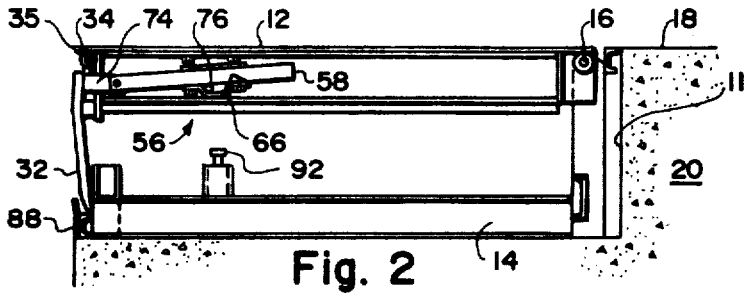
FIG. 2 is a fragmentary sectional view of the apparatus of FIG. 1 in closed position taken along line 2—2 of FIG. 1.
Figure 3:
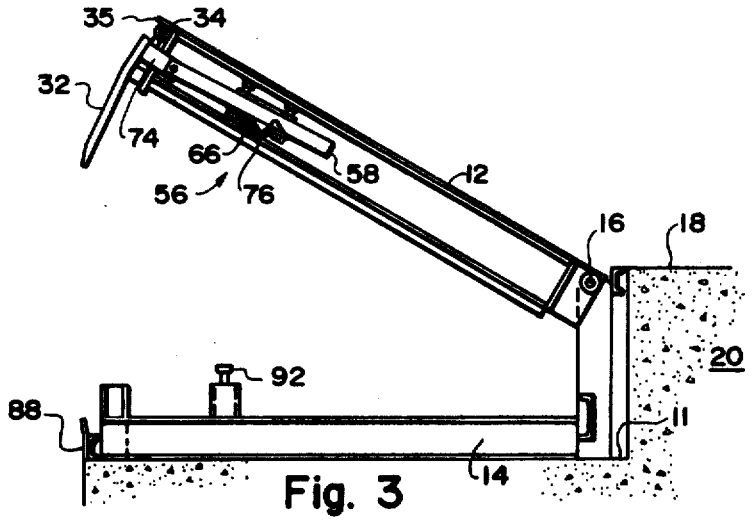
Figure 6:
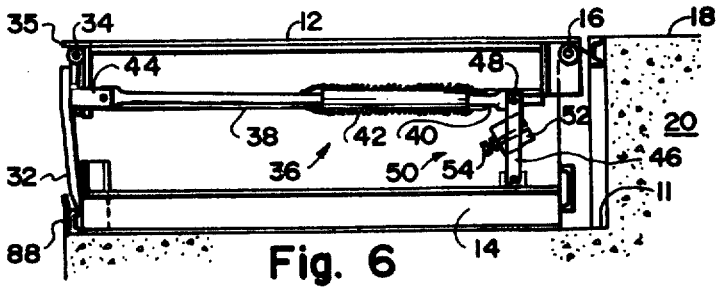
FIG. 6 is another fragmentary sectional view of the apparatus of FIG. 1 in closed position taken along line 6—6.
Figure 7:
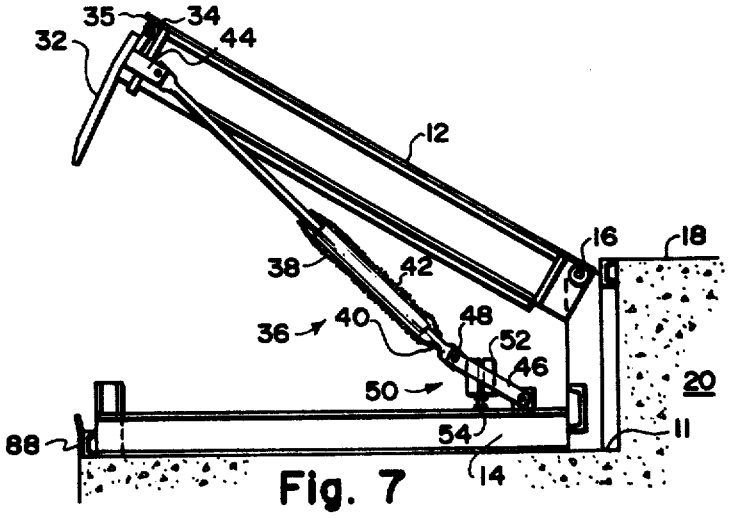
Figure 8:
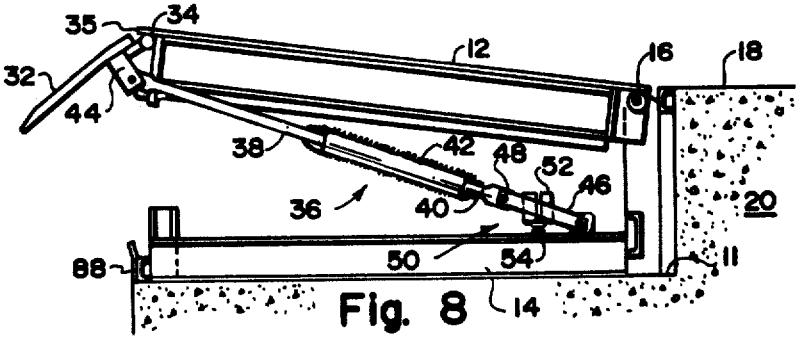

In the normal course of events, the ramp 12 will be in the down position generally as indicated in FIGS. 2 and 6 to provide a level surface for cross traffic along the loading dock[,] *and* it will be held down in horizontal position against the upward bias of spring 22 by a hold down 30. No particular description of hold down 30 appears necessary because it provides no part of the novelty of this invention. It is merely a ratchet and pawl type arrangement conventional in many of the dock levelers now on the market and well known in the industry.

A lip 32 is mounted on the front portion of the ramp and is pivoted about an axis 34 of conventional hinge means. However, it will be observed that the deck 12 extends forwardly at 35 beyond the edge of the hinge means and it serves the very useful function of preventing falling debris such as sticks, bolts, etc. from fouling the hinge. Additionally, rain and snow often form freezing blocks of ice in exposed hinge areas and inhibit the free swinging operation necessary in outside operation during the winter period. The forward extension 35 of the deck 12 serves in large measure to prevent the ice formation and other types of fouling of the hinge area.

A lip projecting arm 36 shown at the left side of FIG. 1 and in FIGS. 6–9 consists of telescoping tubes 38 and 40 which are biased together against elongation by spring means 42. The reason for the extensible arm [38] *36* is to allow some play in the peak height of the ramp 12. With a rigid arm [38] *36*, rather close tolerances are necessary in adjustment of the spring 22 and some sort of stop means is usually required on the lever arm. 24. With the extensible arm [38] *36* as designed herein the tolerances can be relatively ignored and the springs 42 will hold the telescopic tubes 38 and 40 together without any difficulty.

Lug means 44 project from the inside surface of the lip 32 and one end of arm 36 is pivoted therefrom. The other end of the arm 36 is pivoted from a short bar 46 which in turn is pivoted from the frame 14. The pivot point between the bar 46 and arm 36 forms a knuckle joint 48 having a particular function which will be described in more detail in the description of the operation of the invention.

Intermediate the ends of the bar 46 is a projection indicated generally at 50 comprising a sleeve 52 into which is threaded a bolt 54. The purpose of the projection 50 is to limit the rotation of the knuckle joint in a forward direction. The head of bolt 54 comes into contact with the frame 14 or some other substrate and this controls the point at which the lip projecting arm 36 will pass the equilibrium point with the bar 46 and kick over to the release position. The reason for the desire for the control will be explained subsequently.

Figure 10:
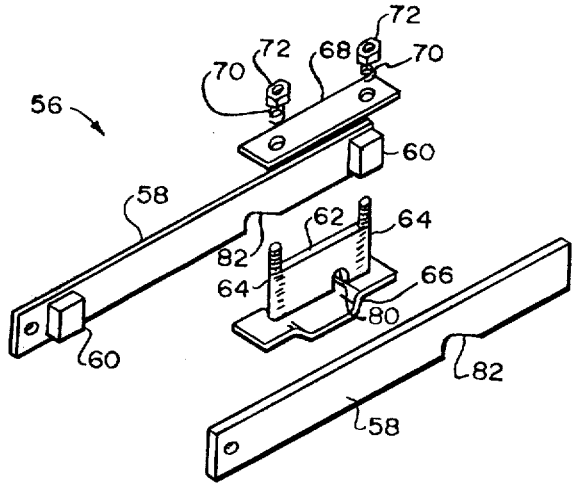
FIG. 10 is an exploded view of the lip dock apparatus of this invention.

Observing FIGS. 10 and [2–6]*2–5*, the lip lock apparatus 56 includes a pair of parallel plates 58 which are welded together in parallel position but spaced apart by spacers 60. Spacers 60 are of greater width than *a* block 62 *interposed between the plates 58* and thus block 62 may slide longitudinally in the space between the plates 58. Bolts 64 are welded to each end of block 62 and [the] *an* elongated shallow U-shaped bracket 66 [which] *is*

*secured to the bottom of the block and* serves to bear against the underside of plates 58 during the sliding motion of the block 62. A cover plate 68 *positioned on the top of the block 62 and secured thereto by the bolts 64* serves a similar function on the top of the plates 58. The bracket 66 [is] *and cover plate 68 are* biased [upward] into contact with [the] *respective* lower *and upper* portions of the plates 58 by spring means 70 which circumscribe the threaded upper portion of bolts 64 and which are compressed by nuts 72.

The forward ends of plates 58 are pivotally supported [in] *between downwardly projecting* lugs 74 *on the lip 32* and the rear portion is slidably supported on a pin 76 projecting between downwardly extending lugs 78 on the underside of the ramp 12. The pin projects through the space between the *bottom of the block 62 and under the* bracket 66 and the lower surface of the plates 58. For convenience in FIGS. 2–5, the nearer *of* the [lug] *lugs* 78 is not illustrated to better show the relative sequential movement of the pin, bracket and plates. [Spring means 70 hold the bracket 66 stationary on the bottom edges of plates 58 except for movement forced by pin 76.]

A *downwardly opening* groove 80 is formed in the underside of the block 62 *to receive the pin 76* and *downwardly opening* notches 82 are formed on the underside of plates 58. The notches 82 [being coaxial and axis of the notches and the axis of the groove 80 are parallel with] *in the two plates 58 are longitudinally aligned to cooperatively receive the pin 76 and, at one point in the relative movement of the plates 58 and block 62, these notches will align with the groove 80 for cooperative and concurrent receipt of* the pin 76.

The pin 76 is designed to float within the shallow U-shaped bracket 66 and accordingly, the depth of the bracket 66 *with respect to the bottom of the block 62* is greater than the diameter of the pin 76. The functions of the notches 82 and the groove 80 are to receive the pin 76 in locking engagement such that the weight of the lip 32 pressing against plates 58 through lugs 74 will not cam the pin 76 out of the [slots] *bracket groove 80 by means of the notches* 82 and back into the U-shaped bracket 66. Accordingly, it is necessary that the depth of the groove [80] *76* and notches 82 be greater than the radius of the pin 80. To insure that the pin will not be cammed out of the notches the angle of the camming pressure should be at least 90°, *that is, the forward edge surface should be perpendicular to the longitudinal axis of the plates 58.*

Figure 9:
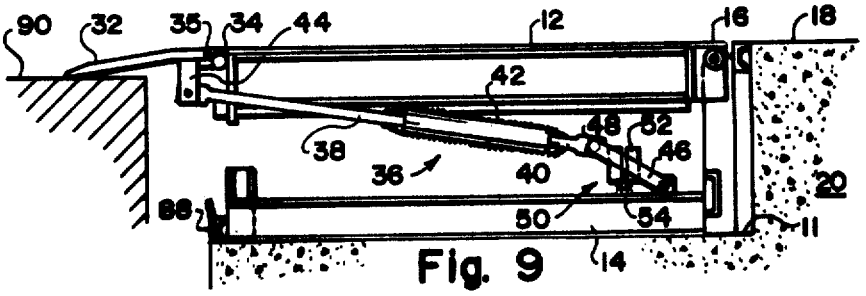

In operation, a workman will cause the ramp 12 to be raised by pulling the chain 84 which releases the ramp hold down 30 and allows the spring 22 to [bias] *swing or pivot* the ramp upward *to a fully raised position*. He will then walk out on the ramp 12 [to force it down] *and his weight will then cause the ramp to swing downwardly*. If for some reason, he does not wish the lip 32 to project, he will *first* pull the chain 86 which will force the knuckle joint 48 over *center to place the arm 36 and bar 46 in a relative position as in FIG. 9 where the arm 36 will be ineffective* and will not project the lip 32 and the ramp will simply descend [to] *with the lip 32 hanging downward in* the position shown in FIG. [2] *3*. However, as a general rule, the desire will be to project the lip. Accordingly, as the weight of the workman causes the ramp to descend, the arm 36, acting through lugs 44, will cause the lip 32 to *swing upwardly with respect to the ramp 12 and* project outward as the ramp 12 pivots downward *as sequentially shown in FIGS. 6–9*. The arm 36 will continue to project the lip until just after the bar 46 and arm 36 become a straight line at which time the knuckle joint [46 will] *48 passes through center permitting the arm and bar to* bend *as shown in FIG. 9* and the force to project the lip 32 will be released.

Figure 4:
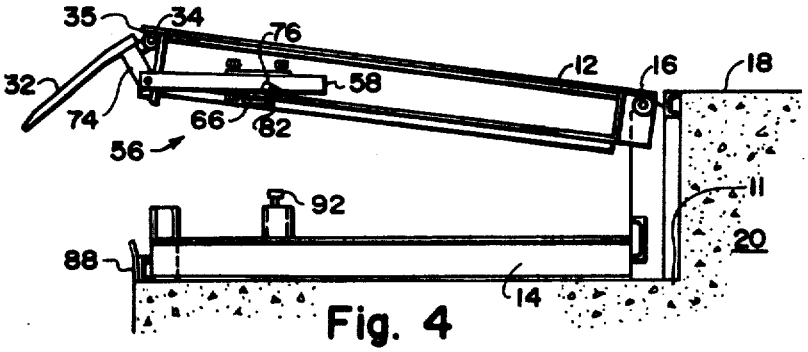
Figure 5:
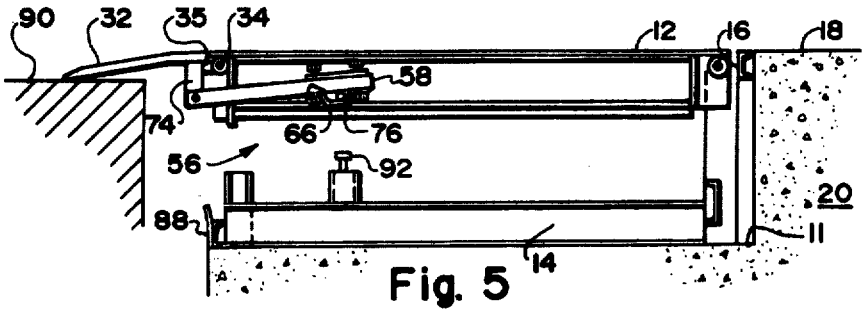

Observing FIGS. 2–5, it will be seen that at the rest position *of FIG. 2,* with the lip 32 approximately perpendicular to [the] *a* ramp 12 and behind the keeper 88 *secured to the frame 14,* the pin 76 is at the forwardmost portion of the U-shaped bracket 66. Similarly, in FIG. 3 with the ramp raised to its maximum, the pin 76 is still forward because the lip 32 is still at an angle perpendicular to the ramp. As the lip [projector] *projection arm* 36 begins to project *or swing* the lip *upwardly* during the walk down, the plates 58 will be pulled forward by the lugs 74 and the pin 76 being *held* stationary *by its supporting lugs 78* will slide to the rear of the U-shaped bracket to a point most remote from the lip *since the block 66 is carried with the forwardly moving plates 58 through frictional clamping engagement of the bracket 66 and cover plate 68 with the two plates 58.* At that point the bracket will *be restrained against further movement with the plates 58 and will* begin to slide *along the plates. This movement continues* until the [pin pushes the bracket to a point where the upwardly opening U-shape moves under the] notches 82 *align with the groove 80 which was previously aligned with the pin 76.* The weight of the apparatus 56 *then* causes it to fall such that the pin *76* moves into the *aligned groove 80 and* notches *82 as shown in FIG. 4.* At this point in time or slightly thereafter, the lip projector is designed to release as the knuckle joint 48 passes equilibrium and flips over. The bolt 54 should be adjusted to provide that the knuckle joint 48 will not flip over until the pin 76 is engaged in the [slots] *aligned groove 80 and notches* 82. Thereby, lip lock apparatus 56 will then hold the lip 32 in projected position until the lip engages the bed of a truck or other vehicle *90* to be serviced. With the lip *32* engaging the bed of the truck *90 as shown in FIG. 5,* the ramp *12* will continue to descend and the lip will be *further* pivoted *or projected* to a position near parallel with the ramp. During this sequence the rear sloping *edge* surface of the [slot] *notches* 82 will cam the pin *76 relatively downward and* out of [slot] *notches* 82 and *the block groove 80 and* back into the U-shaped bracket 66 as the plates 58 are pulled even further forward *and thus unlatches the lip lock apparatus.* As the [pin moves back, it will force] *plates 58 move relatively forward,* the block 62 [to the rear by pressing against the rear surface of the groove 80 and] *will become positioned further rearward on the plates when,* at the full extension of the lip, the block will be almost to the rear of the plates 58 as shown in FIG. 5. *It will be noted here that the plates 58, except when relatively positioned to align the notches 82 with the groove 80 and pin 76, will be supported on the pin 76 and will be free to slide on top of the pin.*

When the truck *90* pulls away and the lip *32* is [released] *thereby freed* to fall to the perpendicular position, [the pin will first move to the forward portion of the bracket 66 before it begins to drive the bracket forward. With the pin in the forward position of the bracket 66 it cannot slide into notches 82 because the block 62 at the forward portion of the bracket 66 prevents such vertical movement, groove 80 is not aligned with the pin, note particularly FIG. 10.] *with respect to the ramp 12, it will be seen that the lip lock apparatus 56 remains unlatched and ineffective and thus permit the lip to pivot downwardly. As the lip 32 pivots downwardly, the plates 58 will slide rearwardly along and be supported on the pin 76. During initial rearward movement of the plates 58, the block 62 will be carried rearwardly therewith through the frictional clamping engagement of the bracket 66 and cover plate 68. However, the block 62 will be restrained against further rearward movement when the pin 76 reaches the forward end of the bracket 66. Continued rearward movement of the plates 58 will result in the notches 82 moving into alignment with the pin 76 but the plates 58 will not drop because the groove 80 in the block 62 is not concurrently aligned therewith. The block 62 thus supports the plates 58 for continued rearward movement as the block is supported on the pin 76 and the plates are then supported on the bracket 66 carried by the block. Thus, the plates 58 may continue their rearward movement thereby permitting the lip to continue pivoting to its full down position.*

A lip lock release means is provided for those occasions where the lip *32* is projected and locked into place but then there is some reason to release the lip without having engaged the bed of a truck or there is no truck at the dock. This release means is provided in the form of a bolt 92 projecting upward from the frame 14. When the ramp descends below the level of the surrounding dock, the lower surface of the bracket 66 will engage the top of the bolt 92. This will push the plates 58 *and block 62* upward and disengage the pin 76 from the [slots] *groove 80 and notches* 82. [at which time] *This unlatches the lock apparatus 56 as previously described and* the lip 32 will fall by gravity to its pendant position.

Having thus described the invention in its preferred embodiment, it will be clear to those having ordinary skill in the art that obvious modifications may be made without departing from the spirit of the invention. Additionally, the language used to describe the invention is not considered limiting. Rather it is intended that the only limitations on the scope of the invention be as set out in the appended claims.

I claim:

1. Lip lock means for maintaining a pivotable lip of a pivotable ramp associated with a loading dock in projected position until released by (1) pivoting the lip to a position near parallel with the ramp or (2) pivoting the lip end of the ramp to a downwardly inclined position to engage a lip lock release means, comprising, parallel plates secured together and sandwiching therebetween a block, the plates each being longer than the block and spaced apart by a width greater than the width of the block whereby the block is longitudinally slidable between the plates, means for securing the block in the space between the plates and the lower portion of the securing means comprising a bracket of a generally elongated shallow U-shape, the open end of the U-shaped bracket facing upward toward the lower edges of the plates, the bracket being attached to and slidable with said block, the front end of the plates being pivotally connected to the lip and the rear end of the plates being unattached, means associated with the [deck] *ramp* for supporting a pin, said pin projecting through the space between the plates and the U-shaped bracket and thereby supporting the plates, the pin having a diameter less tnan the depth of the U-shaped bracket, a groove in the lower surface of the block having an axis parallel to the pin and a depth greater than the radius of the pin, the groove being located to open downwardly into the open face of the U-shaped bracket at the end of the bracket most remote from the lip, notches formed in the lower surfaces of each of the plates and of a depth greater than the radius of the pin, the notches in the two parallel plates having a common axis parallel with the pin, surface means forming the [slots] *notches* wherein the surface means nearest the lip is shaped for preventing the pin from being *relatively* cammed, from the [slots] *notches* as a result of force exerted by the weight of the lip acting on the plates.

2. The lip lock means of claim 1 wherein the surface of the notches most remote from the lip slopes to a smaller notch depth away from the lip to thereby *relatively* cam the pin out of the notches as the lip pivots toward a plane parallel with the ramp.

3. The lip lock means of claim 2 wherein the lip lock release means comprises means for blocking the descent of the plates relative to the descent of the pin.

4. The lip lock means of claim 3 wherein the U-shaped bracket is of a width greater than the width between the plates.

5. The lip lock means of claim 4 in combination with automatic lip projecting and release means for raising the lip relative to the ramp until the pin moves into the [slot] *notch* and thereafter releasing the lip to be supported by the pin.

6. The lip lock means of claim 1 in combination with automatic lip projecting and release means for raising the lip relative to the ramp until the pin moves into the [slot] *notch* and thereafter releasing the lip to be supported by the pin.

7. The lip lock means of claim 1 wherein the lip lock release means comprises means for blocking the descent of the plates relative to the descent of the pin.

8. In the combination of dock leveling apparatus associated with a loading dock which is designed for loading and unloading vehicles; the loading dock having a generally planer upper surface; the apparatus including a ramp having front and rear portions and pivotally mounted at its rear portion; means associated with the ramp for releasibly blocking the upward movement of the ramp; means for pivoting the ramp upward upon release of said blocking means; lip means pivotally attached to the front portion of the ramp, said lip *means* being for bridging the gap between the ramp and a bed of a vehicle and for limiting the descent of the front portion of the ramp below said bed; means for limiting the angle of pivot of the lip means from approximately parallel with the ramp to about a downwardly extending right angle with the ramp; means for automatically pivoting the lip upwardly from its right angle position to a projected position following (a) release of the ramp blocking means and (b) the upward pivoting movement of the ramp and during subsequent downward pivoting movement of the ramp; the automatic lip pivoting means comprising a straight arm pivoted from both ends, one end being pivoted from the lip and the other end pivoting from a short bar, the short bar being pivotally anchored to a substrate, said substrate being stationary relative to said dock, projecting means extending from the bar intermediate its pivot points for limiting the pivoting of said bar toward the substrate and means for releasing the automatic lip pivoting means during the ramp descent while the front portion of the ramp is above the level of the dock; lip lock means for maintaining the lip in projected position after the automatic lip pivoting means is released and until (1) the front portion of the ramp descends below the level of the dock to engage lip lock release means (2) the lip is pivoted to a position near parallel with the ramp; the improvement comprising:

the [projection] *projecting* means extending from the bar [is] *and* adjustable in length to cooperatively coordinate the release of the automatic lip pivoting means with the time *that the* lip lock means is positioned to support the lip in *a* projected position.

9. The combination of claim 8 wherein the lip lock means comprises parallel plates secured together and sandwiching therebetween a block, the plates each being longer than the block and spaced apart by a width greater than the width of the block whereby the block is longitudinally slidable between the plates, means for securing the block in the space between the plates and the lower portion of the securing means comprising a bracket of a generally elongated shallow U-shape, the open end of the U-shaped bracket facing upward toward the lower edges of the plates, the bracket being attached to and slidable with said block, the front end of the plates being pivotally connected to the lip and the rear end of the plates being unattached, means associated with the ramp for supporting a pin, said pin projecting through the space between the plates and the U-shaped bracket and thereby supporting the plates, the pin having a diameter less than the depth of the U-shaped bracket, a groove in the lower surface of the block having an axis parallel to the pin and a depth greater than the radius of the pin, the groove being located to open downward into the open face of the U-shaped bracket at the end of the bracket most remote from the lip, notches formed in the lower surfaces of each of the plates and of a depth greater than the radius of the pin, the notches in the two parallel plates having a common axis parallel with the pin, surface means forming the notches whereby the surface means nearest the lip is shaped for preventing the pin from being cammed from the [slots] *notches* as a result of force exerted by the weight of the lip acting on the plates.

10. The combination of claim 9 wherein the projection means extending from the bar is adjustable in length to cooperatively coordinate the release of the automatic lip pivoting means with the time the pin moves into the notches in the lip lock means.

11. The combination of claim 8 wherein the straight arm of the automatic lip pivoting means comprises coaxially mounted tubes, said tubes allowing an angular swing of the ramp greater than needed for the lip to rise above the truck bed, means biasing the tubes together.

12. The combination of claim 8 wherein the lip is pivoted from the ramp by hinge means and the ramp extends horizontally beyond the hinge means to guard the pivot axis against falling material, ice and the like which might impair the pivoting movement.

*13. The combination of claim 8 wherein the lip lock means comprises*

*support means carrying an elongated pin in underlying relationship to the ramp and lip,*

*an elongated plate having one end thereof pivotally supported to permit swinging movement thereof in a plane transverse to the axis of said pin disposed beneath the ramp and lip in longitudinally extending relationship thereto, said plate having formed therein a notch with an axis parallel to said pin and opening at a longitudinal edge of the plate for receiving said pin when the lip is pivoted to the projected position, said notch having surface means shaped to prevent the pin from being cammed from the notch as a result of force exerted by the weight of the lip,*

*a block disposed adjacent said plate in longitudinally slideable relationship thereto, and having formed therein a groove with an axis parallel to said pin and opening at an edge surface to receive said pin when aligned with the notch in said plate,*

*means securing said block in association with said plate to permit relative longitudinal displacement between said plate and block, said means including a U-shaped bracket secured to said block with the open end of said bracket facing toward the edge of said block at which the groove opens for retaining the pin in association with said block, said bracket being of a length and depth greater than said pin and secured to said block to permit relative displacement of said pin into and out of said groove and to permit relative longitudinal displacement of said pin along the aforesaid edge surface of said block between a position aligned with said groove and a position not so aligned.*

*14. The combination of claim 13 wherein the lip lock release means comprises means cooperatively engageable with the lip lock upon pivoting of the lip end of the ramp to a downwardly inclined position to displace said plate and block relative to said pin for disengaging said pin from the respective notch and groove whereby said plate and block may be longitudinally displaced relative to each other and to said pin and permit downward swinging of the lip with respect to the ramp.*

*15. The combination of claim 13 wherein said plate and block are longitudinally displaced with respect to said pin by pivoting of the lip toward a projected position at which position said pin enters the notch and groove of the respective plate and block and the lip is thereafter supported in the projected position by said pin.*

*16. Lip lock means for maintaining a pivotable lip of a pivotable ramp associated with a loading dock in a projected position until released by (1) pivoting the lip to a position near parallel with the ramp or by (2) pivoting the lip end of the ramp to a downwardly inclined position to engage lip lock release means,*

*comprising in mechanically coupled relationship between the pivotable lip and ramp*

*support means carrying an elongated pin in underlying relationship to the ramp and lip,*

*an elongated plate having one end thereof pivotally supported to permit swinging movement thereof in a plane transverse to the axis of said pin disposed beneath the ramp and lip in longitudinally extending relationship thereto, said plate having formed therein a notch with an axis parallel to said pin*

*and opening at a longitudinal edge of the plate for receiving said pin when the lip is pivoted to the projected position, said notch having surface means shaped to prevent the pin from being relatively cammed from the notch as a result of force exerted by the weight of the lip,*

*a block disposed adjacent said plate in longitudinally slideable relationship thereto and having formed therein a groove with an axis parallel to said pin and opening at an edge surface to receive said pin when aligned with the notch in said plate,*

*means securing said block in association with said plate to permit relative longitudinal displacement between said plate and block, said means including the U-shaped bracket secured to said block with the open end of said bracket facing toward the edge of said block at which the groove opens for retaining the pin in association with said block, said bracket being of a length and depth greater than said pin and secured to said block to permit relative displacement of said pin into and out of said groove and to permit relative longitudinal displacement of said pin along the aforesaid edge surface of said block between a position aligned with said groove and a position not so aligned.*

*17. Lip lock means according to claim 16 wherein said plate and block include frictional engagement means whereby said block is displaced with said plate upon longitudinal displacement of said plate to the extent permitted by said U-shaped bracket in cooperation with said pin.*

*18. Lip lock means according to claim 16 wherein said notch has surface means to relatively cam the pin from said notch upon longitudinal displacement of said plate as a consequence of pivoting the lip from the projected position to a position near parallel with the ramp.*

*19. Lip lock means according to claim 16 wherein said pin is supported by said ramp and said plate is pivotally connected to said lip.*

*20. Lip lock means according to claim 16 wherein said pin is horizontally disposed and said plate is disposed in overlying relationship to said pin and is supported thereon throughout longitudinal displacement of said plate, said plate and block having the respective notch and groove formed therein in downwardly opening relationship.*

*21. Lip lock means according to claim 16 wherein the lip lock release means comprises means cooperatively engageable with said plate and block upon pivoting of the lip end of the ramp to a downwardly inclined position to displace said plate and block relative to said pin for disengaging said pin from the respective notch and groove whereby said plate and block may be longitudinally displaced relative to each other and to said pin and permit downward swinging of the lip with respect to the ramp.*

*22. Lip lock means according to claim 16 wherein said plate and block are longitudinally displaced with respect to said pin by pivoting of the lip toward a projected position at which position said pin enters the notch and groove of the respective plate and block and the lip is thereafter supported in the projected position by said pin.*

* * * * *